United States Patent
Zhang

(10) Patent No.: US 10,362,087 B2
(45) Date of Patent: Jul. 23, 2019

(54) DATA PROCESSING METHOD AND APPARATUS IN SERVICE-ORIENTED ARCHITECTURE SYSTEM, AND THE SERVICE-ORIENTED ARCHITECTURE SYSTEM

(71) Applicant: Alibaba Group Holding Limited, Grand Cayman (KY)

(72) Inventor: Xikui Zhang, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 366 days.

(21) Appl. No.: 14/853,684

(22) Filed: Sep. 14, 2015

(65) Prior Publication Data
US 2016/0080462 A1    Mar. 17, 2016

(30) Foreign Application Priority Data
Sep. 15, 2014    (CN) .......................... 2014 1 0466215

(51) Int. Cl.
*G06F 15/16* (2006.01)
*H04L 29/08* (2006.01)
*H04L 29/06* (2006.01)

(52) U.S. Cl.
CPC .............. *H04L 67/02* (2013.01); *H04L 69/04* (2013.01)

(58) Field of Classification Search
CPC .................................. H04L 67/02; H04L 43/16
See application file for complete search history.

(56) References Cited

U.S. PATENT DOCUMENTS

| 6,003,087 | A | 12/1999 | Housel, III et al. |
| 7,571,167 | B1 | 8/2009 | Campana et al. |
| 7,606,877 | B2 | 10/2009 | Lee et al. |
| 8,452,837 | B2 * | 5/2013 | Savage ................. H04L 43/04 709/203 |
| 8,612,439 | B2 * | 12/2013 | Prahlad ................. G06F 17/302 707/640 |

(Continued)

FOREIGN PATENT DOCUMENTS

| CN | 1859321 A | 11/2006 |
| CN | 102811140 A | 12/2012 |

OTHER PUBLICATIONS

Mah, "An Empirical Model of HTTP Network Traffic", retrieved on Oct. 27, 2015 at <<http://www.csg.ethz.ch/education/lectures/ATCN/ss2005/schedule/HTTP_Infocom.pdf>>, Proceedings of INFOCOM'97, Apr. 7-11, 1997, IEEE, pp. 592-600.

(Continued)

*Primary Examiner* — Shean Tokuta
(74) *Attorney, Agent, or Firm* — Lee & Hayes, P.C.

(57) ABSTRACT

Data processing method and apparatus in a Service-Oriented architecture (SOA) system are disclosed. The method replaces a target parameter having a larger data length included in an original HTTP request with an intermediate parameter having a smaller data length. A data length of a HTTP request that is converted from an original HTTP request is reduced as compared to a data length of the original HTTP request, thus reducing an amount of data that is transmitted, i.e., sent or received, by a target component, which accordingly reduces an amount of data transmitted in the SOA system and decreases a network overhead of the SOA system.

15 Claims, 8 Drawing Sheets

(56) References Cited

U.S. PATENT DOCUMENTS

| | | | | |
|---|---|---|---|---|
| 8,819,287 B2* | 8/2014 | Alkire | ............... | H04L 29/12009 709/247 |
| 8,855,143 B1* | 10/2014 | Acampora | ........... | H04L 63/1458 370/477 |
| 8,984,048 B1* | 3/2015 | Maniscalco | ....... | G06F 17/30902 709/201 |
| 9,084,105 B2* | 7/2015 | Luna | ........................ | H04W 8/24 |
| 9,170,864 B2* | 10/2015 | Archer | ................. | G06F 9/5055 |
| 9,317,442 B2* | 4/2016 | Arroyo | ............... | G06F 12/1009 |
| 2002/0193127 A1* | 12/2002 | Martschitsch | ...... | H04W 88/184 455/466 |
| 2003/0018450 A1 | 1/2003 | Carley | | |
| 2004/0049596 A1 | 3/2004 | Schuehler et al. | | |
| 2006/0123425 A1* | 6/2006 | Ramarao | ................. | G06F 9/546 719/313 |
| 2006/0248195 A1 | 11/2006 | Toumura et al. | | |
| 2008/0109462 A1* | 5/2008 | Adams | ................. | G06Q 10/107 |
| 2008/0307062 A1* | 12/2008 | Wang | ...................... | H04L 51/04 709/206 |
| 2009/0163230 A1* | 6/2009 | Qu | ........................ | H04W 28/18 455/466 |
| 2010/0011076 A1* | 1/2010 | Shkolnikov | ........... | H04L 51/066 709/206 |
| 2010/0182947 A1* | 7/2010 | Jong | ................. | H04B 7/18513 370/316 |
| 2012/0028660 A1* | 2/2012 | Stafford | ................. | H04W 4/12 455/466 |
| 2012/0072529 A1* | 3/2012 | Ahopelto | ............. | H04L 51/066 709/217 |
| 2012/0096546 A1* | 4/2012 | Dilley | ................ | H04L 67/2804 726/22 |
| 2012/0143966 A1* | 6/2012 | Yang | ...................... | H04L 51/38 709/206 |
| 2012/0155459 A1* | 6/2012 | Bouthemy | .............. | H04L 51/04 370/389 |
| 2012/0278405 A1* | 11/2012 | Costenaro | ........... | H04L 67/2857 709/206 |
| 2012/0310625 A1* | 12/2012 | Wei | ......................... | H04L 67/02 704/8 |
| 2013/0023253 A1* | 1/2013 | Cai | ........................ | H04W 4/12 455/414.4 |
| 2013/0196698 A1* | 8/2013 | Lee | ......................... | H04W 4/18 455/466 |
| 2013/0311594 A1* | 11/2013 | Luna | ..................... | H04L 43/065 709/213 |
| 2014/0282032 A1* | 9/2014 | Brown | ................. | G06F 3/0484 715/738 |
| 2016/0036903 A1* | 2/2016 | Pal | ...................... | H04L 67/1004 709/213 |
| 2016/0095043 A1* | 3/2016 | Maria | .................. | H04W 40/24 370/254 |
| 2017/0134917 A1* | 5/2017 | Dennard | ........... | H04M 3/42382 |

OTHER PUBLICATIONS

PCT Search Report and Written Opinion dated Dec. 14, 2015 for PCT Application No. PCT/US15/50018, 7 pages.

English Translation of Chinese Search Report for Application No. 201410466215.2, a foreign counterpart of U.S. Appl. No. 14/853,684, dated Feb. 12, 2018, 2 pages.

\* cited by examiner

DATA PROCESSING METHOD AND APPARATUS IN SERVICE-ORIENTED ARCHITECTURE SYSTEM, AND THE SERVICE-ORIENTED ARCHITECTURE SYSTEM

CROSS REFERENCE TO RELATED PATENT APPLICATION

This application claims foreign priority to Chinese Patent Application No. 201410466215.2 filed on Sep. 15, 2014, entitled "Data Processing Method and Apparatus in Service-Oriented Architecture System, and the Service-Oriented Architecture System", which is hereby incorporated by reference in its entirety.

TECHNICAL FIELD

The present disclosure relates to data processing technologies, and in particular, to data transmission methods and apparatuses in a Service-Oriented Architecture (SOA) system, and the SOA System.

BACKGROUND

In a Service-Oriented Architecture (SOA) system, a function (referred to as a service) of an application may be constructed from multiple components that are loosely coupled and have a universal interface definition mode. An interface is defined in a neutral fashion and needs to be independent of hardware platforms, operating systems and programming languages that implement the service. The components may invoke each other by using the interfaces thereof to complete the service of the application. This characteristic type of neutral interface definition (which is not compulsively bound to a particular implementation) is called a loose coupling among components. When processing a Hypertext Transfer Protocol (HTTP) request that is received from the outside of a SOA system, the SOA system needs to perform transmission and processing sequentially, following an invocation path in the SOA system. The invocation path in the SOA system may be made up of multiple components. Each component on the invocation path needs to transmit and process the HTTP request, until the last component on the invocation path acquires the HTTP request and completes the processing thereof.

However, since no special restriction is imposed by a POST request of HTTP on a length of data that is transmitted, each component on the invocation path in the SOA system that corresponds to the POST request of HTTP may transmit a large, or even an excessively large amount of data, which results in an increased network overhead of the SOA system.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Various aspects of the present disclosure provide a data processing method and apparatus in a Service-Oriented Architecture (SOA) system, and the SOA system to decrease a network overhead of the SOA system.

An aspect of the present disclosure provides a data processing method in an SOA system, which includes obtaining an original HTTP request of a target component that is to be sent, the original HTTP request including M target parameters, and M being an integer greater than or equal to one; assigning intermediate parameters for N target parameters if a data length of the original HTTP request is greater than or equal to a preset data threshold, a data length of the N target parameters being greater than a data length of the intermediate parameters corresponding thereto, and N being an integer greater than or equal to one and less than or equal to M; and performing a parameter replacement processing for the target parameters using the intermediate parameters corresponding to the N target parameters to obtain a converted HTTP request for the target component to send the converted HTTP request.

In an implementation, after assigning the intermediate parameters for the N target parameters in response to the data length of the original HTTP request being greater than or equal to the preset data threshold, the method may further include storing a correspondence relationship between the N target parameters and the intermediate parameters that correspond to the N target parameters.

In an implementation, storing the correspondence relationship between the N target parameters and the intermediate parameters that correspond to the N target parameters may include storing the N target parameters and the intermediate parameters that correspond to the N target parameters in a database or a file system correspondingly.

In an implementation, assigning the intermediate parameters for the N target parameters if the data length of the original HTTP request is greater than or equal to the preset data threshold may further include selecting target parameters having a data length satisfying a preset replacement condition as the N target parameters from the M target parameters if the data length of the original HTTP request is greater than or equal to the preset data threshold; and assigning the intermediate parameters for the N target parameters.

In an implementation, the replacement condition may include the data length being greater than or equal to a length threshold, or first N ranking results obtained by using data lengths as a basis for ranking.

In an implementation, prior to assigning the intermediate parameters for the N target parameters if the data length of the original HTTP request is greater than or equal to the preset data threshold, the method may further include confirming that the original HTTP request is a POST request of HTTP.

Another aspect of the present disclosure provides another data processing method in an SOA system, which includes obtaining a converted HTTP request that is to be processed by a target component, the converted HTTP request including M processing parameters, and M being an integer greater than or equal to one; identifying N intermediate parameters from the M processing parameters, N being an integer greater than or equal to one and less than or equal to M; obtaining a target parameter corresponding to each intermediate parameter of the N intermediate parameters, a data length of each intermediate parameter being less than a data length of the target parameter corresponding thereto; and performing a parameter replacement processing for the intermediate parameters using the target parameter corresponding to each intermediate parameter to obtain an original HTTP request for the target component to perform a service processing on the original HTTP request.

In an implementation, obtaining the target parameter corresponding to each intermediate parameter of the N intermediate parameters may include obtaining the target parameter corresponding to each intermediate parameter of the N intermediate parameters based on a correspondence relationship between the target parameters and the intermediate parameters corresponding to the target parameters.

In an implementation, identifying the N intermediate parameters from the M processing parameters may include identifying the N intermediate parameters based on content in each processing parameter of the M processing parameters; or identifying the N intermediate parameters that are to be processed by the target component based on the content in each processing parameter of the M processing parameters and identification information of target parameters that are to be processed by the target component.

In an implementation the converted HTTP request includes a POST request of HTTP.

In an implementation, the converted HTTP request is generated using the method according to the above aspect and any possible implementation thereof.

Another aspect of the present disclosure provides a data processing apparatus in an SOA system, which includes an acquisition unit to obtain an original HTTP request of a target component that is to be sent, the original HTTP request including M target parameters, and M being an integer greater than or equal to one; an assignment unit to assign intermediate parameters for N target parameters if a data length of the original HTTP request is greater than or equal to a preset data threshold, a data length of the N target parameters being greater than a data length of the intermediate parameters corresponding thereto, and N being an integer greater than or equal to one and less than or equal to M; and a replacement unit to perform a parameter replacement processing for the target parameters using the intermediate parameters corresponding to the N target parameters to obtain a converted HTTP request for the target component to send the converted HTTP request.

In an implementation, the apparatus may further include a storage unit to store a correspondence relationship between the N target parameters and the intermediate parameters that correspond to the N target parameters.

In an implementation, the storage unit may further store the N target parameters and the intermediate parameters that correspond to the N target parameters in a database or a file system correspondingly.

In an implementation, the assignment unit may further select target parameters having a data length satisfying a preset replacement condition as the N target parameters from the M target parameters if the data length of the original HTTP request is greater than or equal to the preset data threshold, and assign the intermediate parameters for the N target parameters.

In an implementation, the replacement condition may include the data length being greater than or equal to a length threshold, or first N ranking results obtained by using data lengths as a basis for ranking.

In an implementation, the apparatus may further include a determination unit to determine that the initial HTTP request is a POST request of HTTP.

Another aspect of the present disclosure provides another data processing apparatus in an SOA system, which includes an acquisition unit to obtain a converted HTTP request that is to be processed by a target component, the converted HTTP request including M processing parameters, and M being an integer greater than or equal to one; an identification unit to identify N intermediate parameters from the M processing parameters, N being an integer greater than or equal to one and less than or equal to M; a correspondence unit to obtain a target parameter corresponding to each intermediate parameter of the N intermediate parameters, a data length of each intermediate parameter being less than a data length of the target parameter corresponding thereto; and a replacement unit to perform a parameter replacement processing for the intermediate parameters using the target parameter corresponding to each intermediate parameter to obtain an original HTTP request for the target component to perform a service processing on the original HTTP request.

In an implementation, the correspondence unit may further obtain the target parameter corresponding to each intermediate parameter of the N intermediate parameters based on a correspondence relationship between the target parameters and the intermediate parameters corresponding to the target parameters.

In an implementation, the identification unit may further identify the N intermediate parameters based on content in each processing parameter of the M processing parameters, or identify the N intermediate parameters that are to be processed by the target component based on the content in each processing parameter of the M processing parameters and identification information of target parameters that are to be processed by the target component.

In an implementation, the converted HTTP request includes a POST request of HTTP.

In an implementation, the converted HTTP request is generated using the apparatus according to the above aspect and any possible implementation thereof.

Another aspect of the present disclosure provides an SOA system, which includes a storage apparatus and the data processing apparatus in the SOA system provided in the foregoing other aspect. The storage apparatus is configured to store a correspondence relationship between the N target parameters and the intermediate parameters corresponding to the N target parameters.

Another aspect of the present disclosure provides another SOA system, which includes a storage apparatus and the data processing apparatus in the other SOA system provided by the foregoing other aspect. The storage apparatus is configured to store a correspondence relationship between the N target parameters and the intermediate parameters corresponding to the N target parameters.

As can be seen from the above technical solutions, in one aspect, embodiments of the present disclosure obtain an original HTTP request to be sent by a target component. The original HTTP request includes M target parameters, with M being an integer greater than or equal to one. The disclosed method and apparatus assign intermediate parameters for N target parameters if a data length of the original HTTP request is greater than or equal to a preset data threshold, with a data length of the N target parameters being greater than a data length of the corresponding intermediate parameters. N is an integer greater than or equal to one and less than or equal to M. The disclosed method and apparatus are able to perform a parameter replacement processing for the target parameters using the intermediate parameters corresponding to the N target parameters to obtain a converted HTTP request. Since a target parameter having a longer data length that is included in the original HTTP request is replaced by an intermediate parameter having a shorter data length so that a data length of the converted HTTP request is reduced as compared to the data length of the original HTTP request, an amount of data sent by the target component is reduced, thus reducing the amount of data transmitted in the SOA system and thereby decreasing the network overhead of the SOA system.

As can be seen from the above technical solutions, in another aspect, the embodiments of the present disclosure identify N intermediate parameters from M processing parameters included in a converted HTTP request that is obtained and is to be processed by a target component. M is an integer greater than or equal to one, and N is an integer greater than or equal to one and less than or equal to M. The disclosed method and apparatus further obtain a respective target parameter corresponding to each intermediate parameter of the N intermediate parameters, with a data length of each intermediate parameter being less than a data length of the respective target parameter corresponding to, and are able to perform a parameter replacement processing for the intermediate parameters respectively using the respective target parameter corresponding to each intermediate parameter to acquire an original HTTP request. Since other components replace a target parameter having a longer data length included in the original HTTP request by an intermediate parameter having a longer data length so that a data length of the converted HTTP request that is obtained is reduced as compared to a data length of the original HTTP request, an amount of data received by the target component is reduced, thus reducing the amount of data transmitted in the SOA system, and thereby decreasing the network overhead of the SOA system.

In addition, since the amount of data transmitted in the SOA system is reduced by using the technical solutions provided by the present disclosure, the network congestion in the SOA system can be effectively avoided, and the processing efficiency and service performance of the SOA system is improved.

Furthermore, since the amount of data transmitted in the SOA system is reduced by using the technical solutions provided by the present disclosure, not all components on a corresponding invocation path need to transmit all target parameters included in an original HTTP request, thereby effectively reducing the hardware requirements for these components. Moreover, since the technical solutions provided by the present disclosure can be implemented independent of service implementation logics of target component(s), no impact has been made on the service implementation logics of the target component(s).

BRIEF DESCRIPTION OF THE DRAWINGS

In order to describe the technical solutions in the embodiments of the present disclosure more clearly, the accompanying drawings aid in describing the embodiments or existing technologies. Apparently, the described accompanying drawings merely represent some embodiments, and not all embodiments, of the present disclosure. One of ordinary skill in the art may still derive other drawings from these accompanying drawings without making any creative effort.

DETAILED DESCRIPTION

In order to make objectives, technical solutions and advantages of the embodiments of the present disclosure more clear, the technical solutions in the embodiments of the present disclosure are described in a clear and comprehensive manner hereinafter with reference to the accompanying drawings in the embodiments of the present disclosure. Apparently, the described embodiments represent a part of and not all of the embodiments of the present disclosure. All other embodiments acquired by one of ordinary skill in the art based on the embodiments of the present disclosure without making any creative effort shall fall in the scope of protection of the present disclosure.

It is noted that components in the present disclosure may be understood as network nodes, for example, network devices such as a server, or understood as logical functions on a network node, such as a service function on a server, which the embodiments do not have limitations thereon.

In addition, a term "and/or" herein merely describes an association relationship among associated objects, indicating that three relationships may exist. For example, A and/or B may indicate that A exists alone, both A and B exist, or B exists alone. In addition, the character "/" herein generally indicates an "OR" relationship between two associated objects that are before and after the character.

With the development of the Internet, data transmission via the Internet has become one of the most common data exchange methods. With the ever-increasing amount of data, the amount of data that is transmitted becomes larger. Two common types of HTTP requests exist. One type is a GET request of HTTP, and the other is a POST request of HTTP. In many cases, a large amount of data needs to be received from the other side, and such data may easily exceed the limit for the data length, such as 1024 bytes, of the GET request of HTTP, and some parameters may even reach several megabytes in size. In a SOA system, an HTTP request needs to be processed by a plurality of components. However, since a POST request of HTTP does not put a limit on a length of data, each component on an invocation path in the SOA system that corresponds to the POST request of HTTP may transmit a large, or even an excessive large amount of data, resulting in an increased network overhead of the SOA system.

Furthermore, a network congestion or even a network storm may occur in the SOA system. Moreover, the processing efficiency and the service performance of the SOA system may also be decreased.

Figure 1:
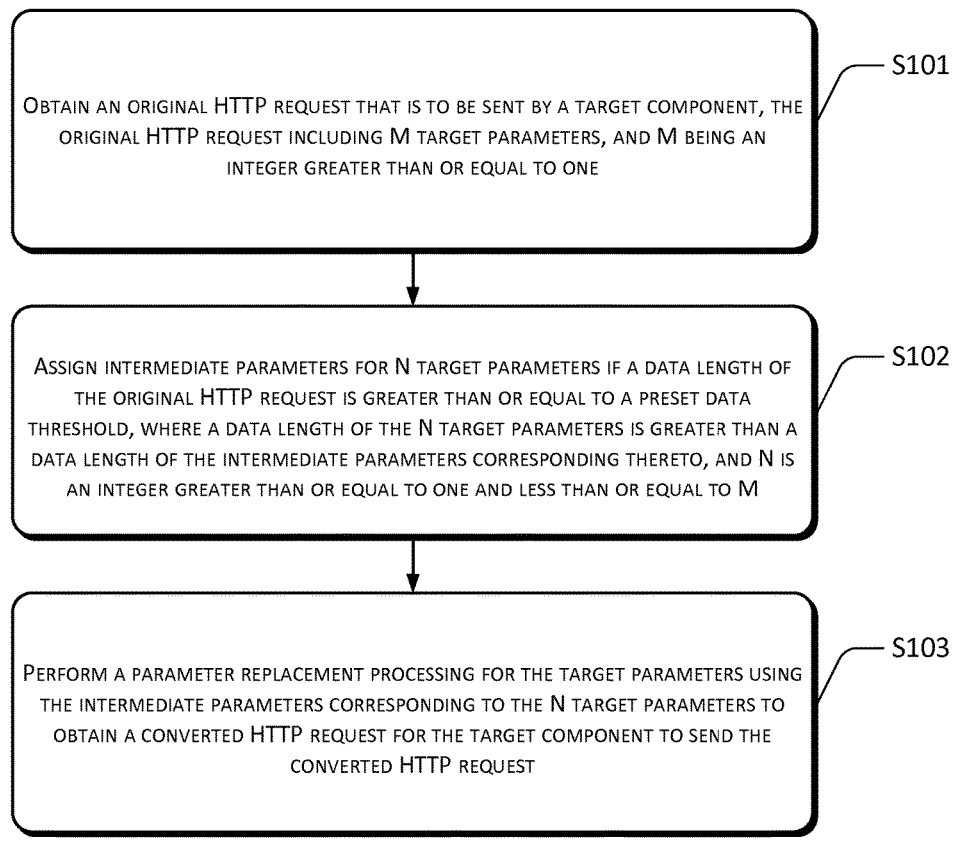
FIG. 1 is a flowchart illustrating a first data processing method in an SOA system according to embodiments of the present disclosure.

FIG. 1 shows a flowchart of a data processing method in an SOA system according to an embodiment of the present disclosure.

S101 obtains an original HTTP request that is to be sent by a target component, the original HTTP request including M target parameters, and M being an integer greater than or equal to one.

S102 assigns intermediate parameters for N target parameters if a data length of the original HTTP request is greater than or equal to a preset data threshold, where a data length of the N target parameters is greater than a data length of the intermediate parameters corresponding thereto, and N is an integer greater than or equal to one and less than or equal to M.

S103 performs a parameter replacement processing for the target parameters using the intermediate parameters corresponding to the N target parameters to obtain a converted HTTP request for the target component to send the converted HTTP request.

It is noted that S101-S103 may be executed by newly-added components, or functional units such as a plug-in or a Software Development Kit (SDK) in the target component, which the embodiments have no limitation thereon.

In this way, since an intermediate parameter having a shorter data length is used to replace a target parameter having a longer data length included in the original HTTP request, a data length of the converted HTTP request that is obtained is reduced as compared to the data length of the original HTTP request. Therefore, the amount of data sent by the target component is reduced, thus reducing the amount of data transmitted in the SOA system, and thereby decreasing the network overhead of the SOA system.

Optionally, in an implementation, the target component may be any component (other than the last component) on an invocation path in the SOA system that corresponds to the original HTTP request. For a detailed description of determining an invocation path in a SOA system that correspond to an HTTP request received by the SOA system, namely an original HTTP request, reference may be made to relevant content in the existing technologies, which is not redundantly described herein.

In general, only the last component on an invocation path corresponding to an HTTP request received by a SOA system in the SOA system that may need to process a large amount of target parameters included in the HTTP request. Therefore, in an implementation, the target component may be the first component on the invocation path corresponding to the original HTTP request in the SOA system. The first component and other components following the first component simply need to transmit the converted HTTP request directly. In this way, the amount of data transmitted by each component on the invocation path corresponding to the original HTTP request in the SOA system is reduced, thus greatly reducing the amount of data transmitted in the SOA system, and thereby further decreasing the network overhead of the SOA system.

Optionally, in an implementation, the obtained target parameters included in the original HTTP request at S101 may include, but are not limited to, eXtensible Markup Language (XML) formatted data, JavaScript Object Notation (JSON) formatted data, Protocol Buffer (PB) formatted data, or simple Key-Value formatted data, which the embodiments do not have any limitation thereon.

Optionally, in an implementation, a data threshold may be further preset in accordance with application requirement(s) of the SOA system before performing S102, e.g., 1024 bytes, to serve as a criterion for determining whether the data length of the original HTTP request received by the target component is overly long or overly large.

Optionally, in an implementation, prior to S102, a type of the originally HTTP request may also be further determined. If the original HTTP request is determined to be one of other HTTP requests different from the POST request of HTTP, such as a GET request of HTTP, S102 and S103 are not needed to be performed because these HTTP requests all have a special restriction on a length of data that is transmitted, for example, no more than 1024 bytes, and a parameter having a long data length will not be transmitted using a GET request of HTTP. If the original HTTP request is determined to be a POST request of HTTP, S102 and S103 may proceed because the POST request of HTTP has no special restriction on the length of data that is transmitted, and a parameter having a long data length needs to be transmitted using the GET request of HTTP.

Optionally, in an implementation, a unique parameter may be assigned for each target parameter of the N target parameters at S102 to serve as an intermediate parameter corresponding to the respective target parameter, and a data length of each target parameter is larger than a data length of the corresponding intermediate parameter.

Optionally, in an implementation, a unique parameter may be assigned for the N target parameters at S102 to serve as an intermediate parameter corresponding to the N target parameters, and a data length of the N target parameters is larger than a data length of the corresponding intermediate parameter.

Optionally, in an implementation, a unique parameter may be assigned for multiple (for example, two or three, etc.) target parameters among the N target parameters at S102 to serve as an intermediate parameter corresponding to the several target parameters, and a data length of the multiple target parameters is larger than a data length of the corresponding intermediate parameter.

Optionally, in an implementation, a method of generating a unique parameter in the existing technologies may be used at S102, in which the unique parameter may include, but is not limited to, a parameter name of the unique parameter and a parameter value of the unique parameter.

For example, a special identifier is defined to indicate a corresponding parameter as an intermediate parameter, and is used as a parameter name of a unique parameter. Alternatively, a special identifier is defined to indicate a corresponding parameter as an intermediate parameter, and is combined with a parameter name of a corresponding target parameter to serve as a parameter name of a unique parameter, etc., which is not specifically limited in the embodiments. A primary key ID recorded in a database may be used as a parameter value of the unique parameter. Alternatively, a relevant computation such as a Hash computation may be performed on the primary key ID recorded in the database to acquire a computation result to serve as the parameter value of the unique parameter. Alternatively, a self-incremental sequence value is further self-defined as the parameter value of the unique parameter, etc., which is not particularly limited in the embodiments.

In an implementation, the special identifier may be numerical digits and/or letters such as 123, abc, or abc123, or may also be other characters supported by the HTTP such as "?", etc., which is not particularly limited in the embodiments.

Optionally, in an implementation, if the data length of the original HTTP request is greater than or equal to the preset data threshold at S102, target parameters having a data length satisfying a preset replacement condition may be selected from the M target parameters to serve as the N target parameters, and the intermediate parameters are further assigned for the N target parameters.

Specifically, the replacement condition may include the data length being greater than or equal to a length threshold, or first N ranking results that are obtained using data lengths as a basis for ranking.

For example, the M target parameters are traversed to acquire data lengths of the traversed target parameters. If a data length of a traversed target parameter is greater than or equal to the length threshold, that traversed target parameter is selected as one of the N target parameters.

Alternatively, for another example, the M target parameters are traversed to acquire the data lengths of the traversed target parameters. The M target parameters are ordered in a descending order of the data lengths. First N target ordering results may be selected as the N target parameters.

It can be understood that the correspondence relationship between the N target parameters and the intermediate parameters that correspond to the N target parameters may further be provided to other components that need to process the target parameters after the method block S102. Two types of provision modes may exist.

One type corresponds to a direct notification mode, which directly sends the correspondence relationship to other components that need to process the target parameters. For example, a private interface may be defined and designated for specially transmitting the correspondence relationship.

Another type corresponds to an indirect notification mode, which stores the correspondence relationship between the N target parameters and the intermediate parameters corresponding to the N target parameters. In this way, the other components that need to process the target parameters may actively acquire the stored correspondence relationship.

In an implementation, the N target parameters and the intermediate parameters corresponding to the N target parameters may be stored in a database or a file system correspondingly. The target parameters may include, but are not limited to, a parameter name of the target parameter, a parameter value of the target parameter, etc., which the embodiments do not have any limitation thereon. The intermediate parameters may include, but are not limited to, a parameter name of the intermediate parameter, a parameter value of the intermediate parameter, etc., which the embodiments have no limitation thereon.

The database may adopt a relational database, such as an Oracle database, a DB2 database, a Structured Query Language (SQL) Server database, a MySQL database, etc., or may also adopt a Key-Value database, such as a Not Only SQL (NoSQL) type database, a Redis database, etc., which the embodiments have no limitation thereon.

For example, a parameter name and a parameter value of each target parameter and a parameter value of an intermediate parameter corresponding to the respective target parameter may be correspondingly stored in a database or a file system. For example, a parameter value of an intermediate parameter corresponding to each target parameter may be used as a Key, and a parameter name and a parameter value of the respective target parameter may be used as a Value, with the Key and the Value being correspondingly stored in a Key-Value type database.

Alternatively, for another example, a parameter name and a parameter value of each target parameter and a parameter name and a parameter value of an intermediate parameter corresponding to the respective target parameter may be stored in a database or a file system correspondingly. For example, a parameter name and a parameter value of an intermediate parameter corresponding to each target parameter may be used as a Key; a parameter name and a parameter value of the respective target parameter may be used as a Value, with the Key and the Value being correspondingly stored in a Key-Value type database.

Optionally, in an implementation, the intermediate parameters corresponding to the N target parameters may be used to replace the target parameters included in the original HTTP request to generate a new HTTP request, namely a converted HTTP, at S103. The converted HTTP request includes N intermediate parameters that are used for replacement.

In the present embodiment, by obtaining an original HTTP request to be sent by a target component (with the original HTTP request including M target parameters, and M being an integer greater than or equal to one) and assigning intermediate parameters for N target parameters if a data length of the original HTTP request is greater than or equal to a preset data threshold (with a data length of the N target parameters being greater than a data length of the corresponding intermediate parameters, and N being an integer greater than or equal to one and less than or equal to M), a parameter replacement processing is able to be performed on the target parameters using the intermediate parameters corresponding to the N target parameters to acquire a converted HTTP request. Since a target parameter having a larger data length included in the original HTTP request is replaced with an intermediate parameter having a smaller data length such that a data length of the acquired converted HTTP request is reduced as compared to the data length of the original HTTP request, an amount of data sent by the target component is reduced, thus reducing the amount of data transmitted in the SOA system, and thereby decreasing the network overhead of the SOA system.

In addition, since the amount of data transmitted in the SOA system is reduced by using the technical solutions provided by the present disclosure, the network congestion in the SOA system can be effectively avoided, and the processing efficiency and service performance of the SOA system is improved.

Furthermore, since the amount of data transmitted in the SOA system is reduced by using the technical solutions provided by the present disclosure, not all components on a corresponding invocation path need to transmit all target parameters included in an original HTTP request, thereby effectively reducing the hardware requirements for these components.

Moreover, since the technical solutions provided by the present disclosure can be implemented independently of service implementation logics of target component(s), no impact has been made on the service implementation logics of the target component(s).

Figure 2:
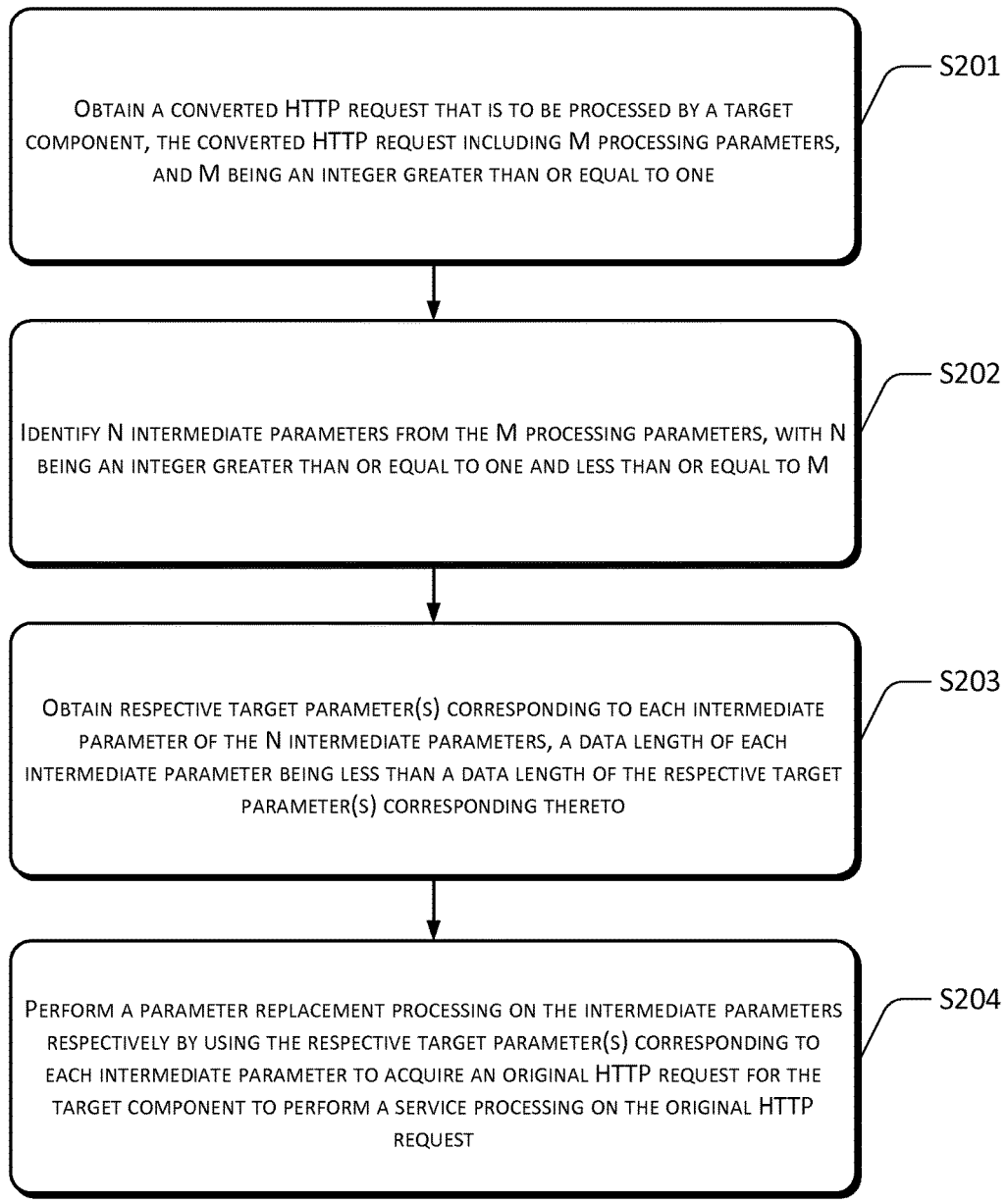
FIG. 2 is a flowchart illustrating a second data processing method in an SOA system according to the embodiments of the present disclosure.

FIG. 2 shows a flowchart illustrating another data processing method in an SOA system according to another embodiment of the present disclosure.

S201 obtains a converted HTTP request that is to be processed by a target component, the converted HTTP request including M processing parameters, and M being an integer greater than or equal to one.

S202 identifies N intermediate parameters from the M processing parameters, with N being an integer greater than or equal to one and less than or equal to M.

S203 obtains respective target parameter(s) corresponding to each intermediate parameter of the N intermediate parameters, a data length of each intermediate parameter being less than a data length of the respective target parameter(s) corresponding thereto.

S204 performs a parameter replacement processing on the intermediate parameters respectively by using the respective target parameter(s) corresponding to each intermediate parameter to acquire an original HTTP request for the target component to perform a service processing on the original HTTP request.

It should be noted that an execution entity of S201-S204 may include newly-added component(s), or may include functional unit(s) such as a plug-in or a Software Development Kit (SDK) in the target component, which the embodiments do not have any limitation thereon.

In this way, since other components use an intermediate parameter having a smaller data length to replace a target parameter having a larger data length included in an original HTTP request to cause a reduction in a data length of a converted HTTP request as compared to a data length of the original HTTP request, an amount of data received by the target component is reduced, thus reducing the amount of data transmitted in the SOA system, and thereby decreasing the network overhead of the SOA system.

Optionally, in an implementation, the converted HTTP request may be generated at S201 using the method provided by the embodiment corresponding to FIG. 1. For detailed description, reference can be made to relevant content in the embodiment corresponding to FIG. 1, which is not repeatedly described herein.

It should be noted that the target component described in this embodiment is not the same as the target component described in the embodiment corresponding to FIG. 1, and they correspond to two components on an invocation path in a SOA system respectively. The target component described in the embodiment corresponding to FIG. 1 is responsible for replacing an original HTTP request by a converted HTTP request. The target component described in the embodiment corresponding to FIG. 2 is responsible for restoring the converted HTTP request into the original HTTP request.

Optionally, in an implementation, the target component in the present embodiment may be any component other than the first component on an invocation path corresponding to the converted HTTP request in the SOA system. For detailed description of determining an invocation path corresponding to an HTTP request, i.e., an original HTTP request, received by a SOA system in the SOA system, reference may be made to relevant content in the existing technologies, which is not redundantly described herein.

In general, only the last component on an invocation path corresponding to an HTTP request received by a SOA system in the SOA system that may need to process a large amount of target parameters included in the HTTP request. Therefore, in an implementation, the target component may be the last component on the invocation path corresponding to the original HTTP request in the SOA system. Other components prior to the target component simply transmit the converted HTTP request directly, without acting as the target component in the present embodiment. In this way, the amount of data transmitted by each component on the invocation path corresponding to the original HTTP request in the SOA system is reduced, thus greatly reducing the amount of data transmitted in the SOA system, and thereby further decreasing the network overhead of the SOA system.

Optionally, in an implementation, the N intermediate parameters may be identified based on the content in each processing parameter of the M processing parameters at S202.

For example, if a special identifier is defined to indicate a corresponding parameter as an intermediate parameter and is used as a parameter name of the intermediate parameter, an identification may be made as to whether a parameter name of a processing parameter is the defined special identifier. If affirmative, that processing parameter is identified as one of the N intermediate parameters. Otherwise, the processing parameter is ignored.

Optionally, in an implementation, the N intermediate parameters to be processed by the target component may be identified based on content in each processing parameter of the M processing parameters and identification information of the target parameters to be processed by the target component at S202.

For example, if a special identifier is defined to indicate a corresponding parameter as an intermediate parameter and is combined with a parameter name of the corresponding target parameter to act as a parameter name of the intermediate parameter, identification may be made as to whether a parameter name of a processing parameter includes the defined special identifier and a parameter name of a target parameter to be processed by the target component. If affirmative, the processing parameter is identified as one of the N intermediate parameters to be processed by the target component. Otherwise, the processing parameter is ignored.

Optionally, in an implementation, the target parameters corresponding to each intermediate parameter of the N intermediate parameters may be obtained based on a correspondence relationship between the target parameters and the intermediate parameters corresponding to the target parameters at S203.

Two types of modes for obtaining the correspondence relationship exist.

One type corresponds to a direct notification mode, which is to directly receive the correspondence relationship. For example, a private interface may be defined and designated for transmitting the correspondence relationship.

Another type corresponds to an indirect notification mode, which is to obtain the correspondence relationship from stored data.

In an exemplary implementation, a search may be conducted in the obtained data based on a parameter value of an intermediate parameter, or a parameter name and the parameter value of the intermediate parameter to acquire corresponding target parameter(s).

Optionally, in an implementation, in 204, the target parameter(s) corresponding to each intermediate parameter may be used to replace the intermediate parameters included in the converted HTTP request to restore a new HTTP request, i.e., the original HTTP. The original HTTP request includes N target parameters that are used for replacement.

Since HTTP requests other than a POST request of HTTP, such as a GET request of HTTP, all have special restrictions on a length of data that is transmitted, for example, no more than 1024 bytes, a parameter having a large data length will not be transmitted using a GET request of HTTP. So, S202-S204 need to be performed only when the converted HTTP request that is obtained is a POST request of HTTP at S201.

The present embodiment identifies N intermediate parameters from M processing parameters included in a converted HTTP request that is obtained and is to be processed by a target component. M is an integer greater than or equal to one, and N is an integer greater than or equal to one and less than or equal to M. The present embodiment further obtains a respective target parameter corresponding to each intermediate parameter of the N intermediate parameters, with a data length of each intermediate parameter being less than a data length of the respective target parameter corresponding to, and is able to perform a parameter replacement processing for the intermediate parameters respectively using the respective target parameter corresponding to each intermediate parameter to acquire an original HTTP request. Since other components replace a target parameter having a longer data length included in the original HTTP request by an intermediate parameter having a longer data length so that a data length of the converted HTTP request that is obtained is reduced as compared to a data length of the original HTTP request, an amount of data received by the target component is reduced, thus reducing the amount of data transmitted in the SOA system, and thereby decreasing the network overhead of the SOA system.

In addition, since the amount of data transmitted in the SOA system is reduced by using the technical solutions provided by the present disclosure, the network congestion in the SOA system can be effectively avoided, and the processing efficiency and service performance of the SOA system is improved.

Furthermore, since the amount of data transmitted in the SOA system is reduced by using the technical solutions provided by the present disclosure, not all components on a corresponding invocation path need to transmit all target parameters included in an original HTTP request, thereby effectively reducing the hardware requirements for these components.

Moreover, since the technical solutions provided by the present disclosure can be implemented independent of service implementation logics of target component(s), no impact has been made on the service implementation logics of the target component(s).

It should be noted that the foregoing method embodiments are expressed as a sequence of a combination of actions for the sake of description. However, one skilled in the art should understand that the present disclosure is not limited by an order of the actions that is described. Based on the present disclosure, some method blocks may be performed in a different order or in parallel. In addition, one skilled in the art should understand that the embodiments described in the specification are exemplary embodiments. Actions and modules that are involved may not be essential in the present disclosure.

In the foregoing embodiments, different emphases have been made on descriptions of the embodiments. For a part of a certain embodiment that is not described in detail, reference may be made to relevant descriptions of other embodiments.

Figure 3:
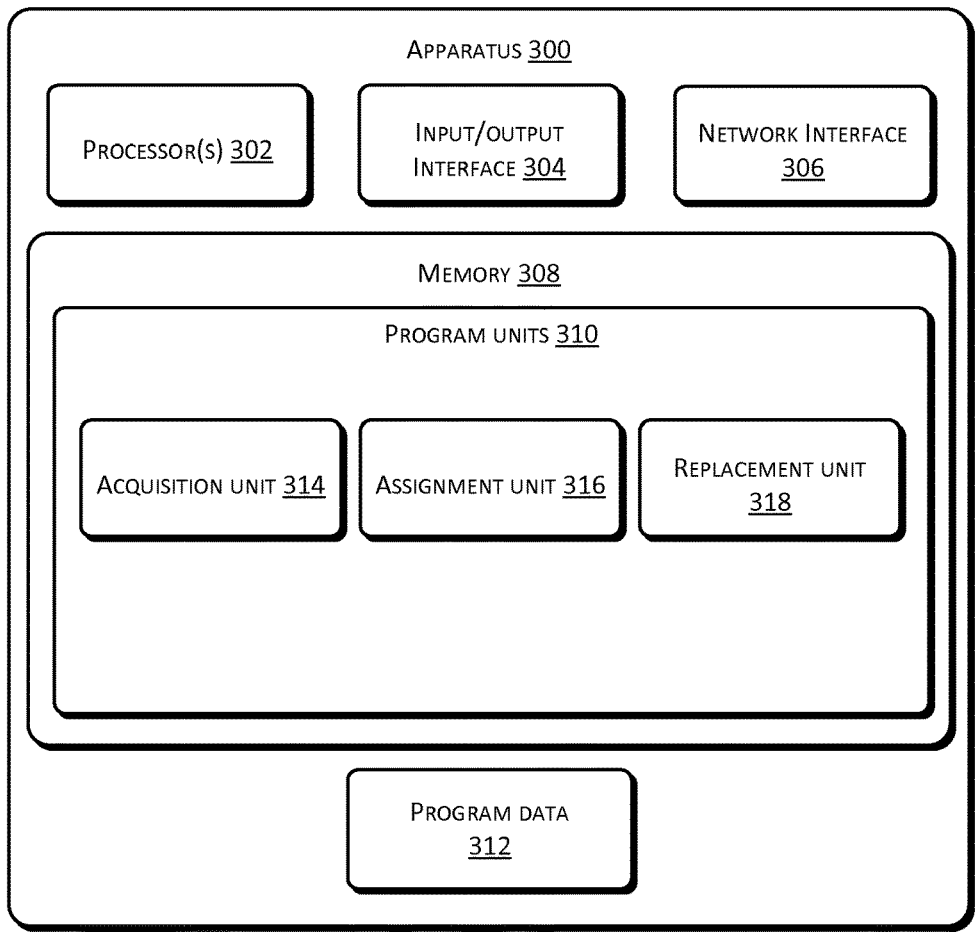
FIG. 3 is a structural diagram illustrating a first data processing apparatus in an SOA system according to the embodiments of the present disclosure.

FIG. 3 is a structural diagram of a data processing apparatus 300 in an SOA system according to another embodiment of the present disclosure. As shown in FIG. 3, the example data processing apparatus 300 in the SOA system may include one or more processors 302, an input/output (I/O) interface 304, a network interface 306 and memory 308.

The memory 308 may include a form of computer readable media such as volatile memory, Random Access Memory (RAM), and/or non-volatile memory, e.g., Read-Only Memory (ROM) or flash RAM, etc. The memory 308 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 308 may include program units 310 and program data 312. The program units 310 may include an acquisition unit 314, an assignment unit 316, and a replacement unit 318. The acquisition unit 314 is configured to obtain an original HTTP request of a target component that is to be sent, the original HTTP request including M target parameters, and M being an integer greater than or equal to one. The assignment unit 316 is configured to assign intermediate parameters for N target parameters if a data length of the original HTTP request is greater than or equal to a preset data threshold, a data length of the N target parameters being greater than a data length of the intermediate parameters corresponding thereto, and N being an integer greater than or equal to one and less than or equal to M. The replacement unit 318 is configured to perform a parameter replacement processing for the target parameters using the intermediate parameters corresponding to the N target parameters to obtain a converted HTTP request for the target component to send the converted HTTP request.

It should be noted that the data processing apparatus 300 in the SOA system provided in the embodiments may be newly-added component(s), or may be functional unit(s) such as a plug-in or a Software Development Kit (SDK) in the target component, which the embodiments have no limitation thereon.

Figure 4:
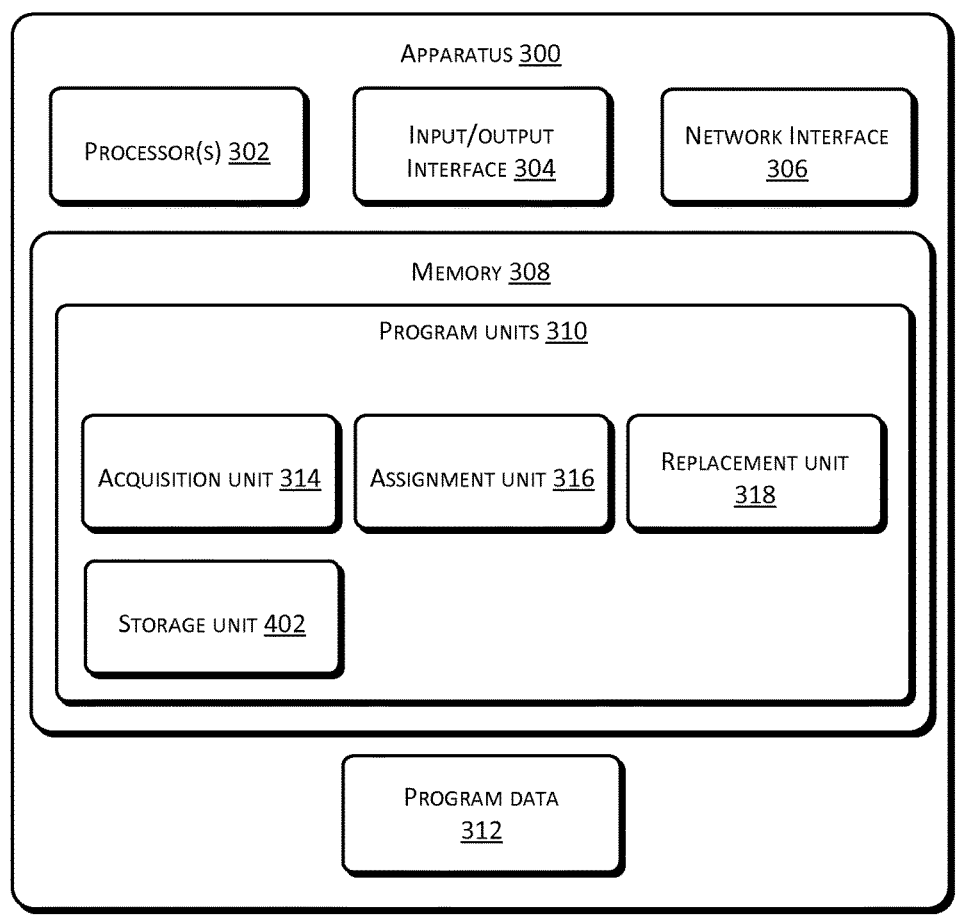
FIG. 4 is a structural diagram illustrating a second data processing apparatus in an SOA system according to the embodiments of the present disclosure.

Optionally, in an implementation, the example data processing apparatus 300 in the SOA system may further include a storage unit 402 configured to store a correspondence relationship between the N target parameters and the intermediate parameters corresponding to the N target parameters as shown in FIG. 4.

In an implementation, the storage unit 402 may store the N target parameters and the intermediate parameters corresponding to the N target parameters in a database or a file system correspondingly.

Optionally, in an implementation, the assignment unit 316 may select target parameters having a respective data length satisfying a preset replacement condition from the M target parameters to serve as the N target parameters in response to the data length of the original HTTP request being greater than or equal to the preset data threshold, and assign the intermediate parameters for the N target parameters.

Specifically, the replacement condition may include the data length being greater than or equal to a length threshold, or first N ranking results that are obtained using data lengths as a basis for ranking.

Figure 5:
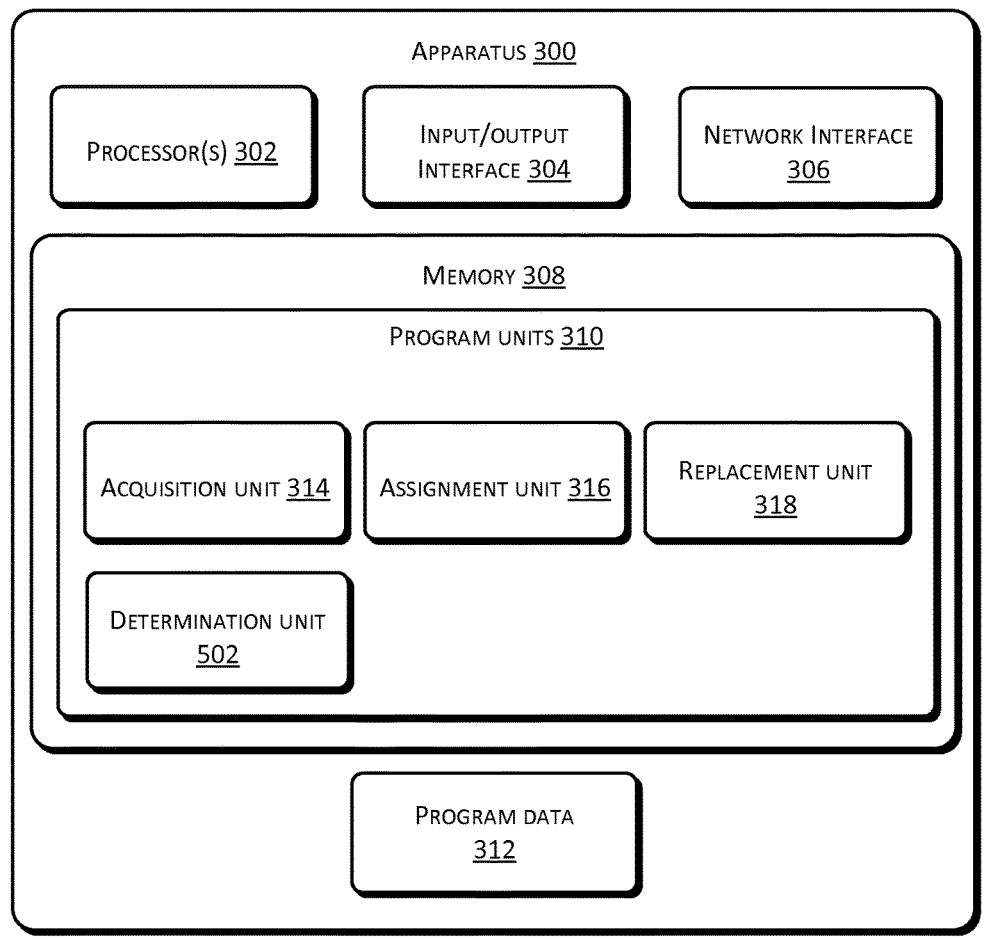
FIG. 5 is a structural diagram illustrating a third data processing apparatus in an SOA system according to the embodiments of the present disclosure.

Optionally, in an implementation, as shown in FIG. 5, the example data processing apparatus 300 in the SOA system may further include a determination unit 502 configured to determine whether the original HTTP request is a POST request of HTTP.

It should be noted that the example method corresponding to FIG. 1 may be implemented by the example data processing apparatus 300 in the SOA system. For detailed description, reference may be made to relevant content in the embodiments corresponding to FIG. 1, which is not repeatedly described herein.

In the present embodiment, an acquisition unit obtains an original HTTP request of a target component that is to be sent, with the original HTTP request including M target parameters, and M being an integer greater than or equal to one. An assignment unit assigns intermediate parameters for N target parameters if a data length of the original HTTP request is greater than or equal to a preset data threshold, with a data length of the N target parameters being greater than a data length of the intermediate parameters corresponding thereto. As such, a replacement unit is able to perform a parameter replacement processing for the target parameters using the intermediate parameters corresponding to the N target parameters to obtain a converted HTTP request. Since a target parameter having a longer data length that is included in the original HTTP request is replaced by an intermediate parameter having a shorter data length so that a data length of the converted HTTP request is reduced as compared to the data length of the original HTTP request, an amount of data sent by the target component is reduced, thus reducing the amount of data transmitted in the SOA system and thereby decreasing the network overhead of the SOA system.

In addition, since the amount of data transmitted in the SOA system is reduced by using the technical solutions provided by the present disclosure, the network congestion in the SOA system can be effectively avoided, and the processing efficiency and service performance of the SOA system is improved.

Furthermore, since the amount of data transmitted in the SOA system is reduced by using the technical solutions provided by the present disclosure, not all components on a corresponding invocation path need to transmit all target parameters included in an original HTTP request, thereby effectively reducing the hardware requirements for these components.

Moreover, since the technical solutions provided by the present disclosure can be implemented independent of service implementation logics of target component(s), no impact has been made on the service implementation logics of the target component(s).

Figure 6:
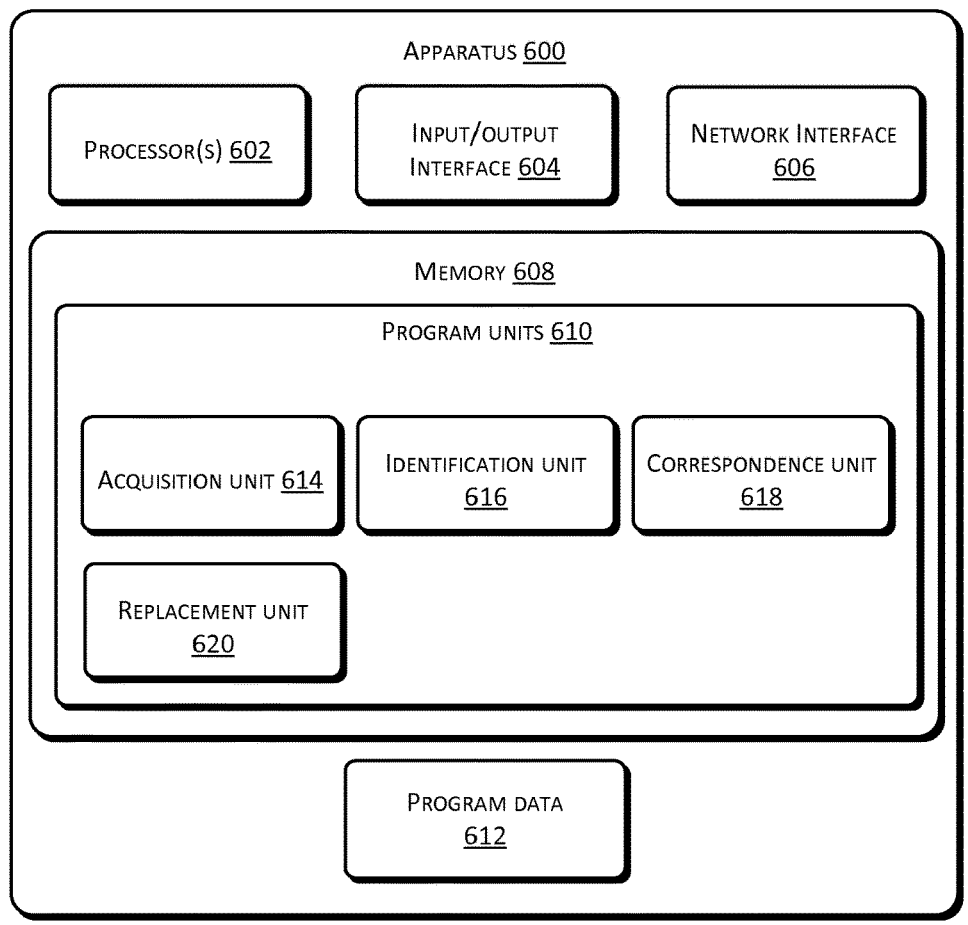
FIG. 6 is a structural diagram illustrating a fourth data processing apparatus in an SOA system according to the embodiments of the present disclosure.

FIG. 6 shows a structural diagram of another data processing apparatus 600 in an SOA system according to another embodiment of the present disclosure. As shown in FIG. 6, the example data processing apparatus 600 in the SOA system may include one or more processors 602, an input/output (I/O) interface 604, a network interface 606 and memory 608.

The memory 608 may include a form of computer readable media as described in the foregoing description.

In an embodiment, the memory 608 may include program units 610 and program data 612. The program units 610 may include an acquisition unit 614, an identification unit 616, a correspondence unit 618 and a replacement unit 620. The acquisition unit 614 is configured to obtain a converted HTTP request that is to be processed by a target component, with the converted HTTP request including M processing parameters, and M being an integer greater than or equal to one. The identification unit 616 is configured to identify N intermediate parameters from the M processing parameters, with N being an integer greater than or equal to one and less than or equal to M. The correspondence unit 618 is configured to obtain target parameter(s) corresponding to each intermediate parameter of the N intermediate parameters, a data length of each intermediate parameter being less than a data length of the target parameter corresponding thereto. The replacement unit 620 is configured to perform a parameter replacement processing for the intermediate parameters using the target parameter(s) corresponding to each intermediate parameter to obtain an original HTTP request for the target component to perform a service processing on the original HTTP request.

It should be noted that the example data processing apparatus 600 in the SOA system may be newly-added component(s), or may be functional unit(s) such as a plug-in or a Software Development Kit (SDK) in the target component, which the embodiments have no limitation thereon.

Optionally, in an implementation, the identification unit 616 may identify the N intermediate parameters based on respective content in each processing parameter of the M processing parameters.

Optionally, in an implementation, the identification unit 616 may identify the N intermediate parameters that are to be processed by the target component based on respective content in each processing parameter of the M processing parameters and identification information of target parameters that are to be processed by the target component.

Since HTTP requests other that a POST request of HTTP, such as a GET request of HTTP, all have special restrictions on a length of data that is transmitted, for example, no more than 1024 bytes, a parameter having a large data length will not be transmitted using a GET request of HTTP. So, other units need to perform corresponding operations only when the converted HTTP request obtained by the acquisition unit 614 is a POST request of HTTP.

Optionally, in an implementation, the correspondence unit 618 may obtain the target parameter(s) corresponding to each intermediate parameter of the N intermediate parameters based on a correspondence relationship between the target parameters and the intermediate parameters corresponding to the target parameters.

Optionally, in an implementation of the embodiment, the converted HTTP request obtained by the acquisition unit 614 may be generated using the apparatus provided by any embodiment corresponding to FIG. 3 to FIG. 5. For detailed description, reference may be made to relevant content in any of the embodiments corresponding to FIG. 3 to FIG. 5, which is not repeatedly described herein.

It should be noted that the method embodiments corresponding to FIG. 2 may be implemented by the example data processing apparatus 600 in the SOA system. For detailed description, reference may be made to relevant content in the embodiments corresponding to FIG. 2, which is not repeatedly described herein.

In the present embodiment, an identification unit is used to identify N intermediate parameters from M processing parameters included in a converted HTTP request that is obtained and is to be processed by a target component, with M being an integer greater than or equal to one and N being an integer greater than or equal to one and less than or equal to M. A correspondence unit is then used to obtain target parameter(s) corresponding to each intermediate parameter of the N intermediate parameters, with a data length of each intermediate parameter being less than a data length of the corresponding target parameter(s). As such, a replacement unit is able to perform a parameter replacement processing for the intermediate parameters using the target parameter(s) corresponding to each intermediate parameter to acquire an original HTTP request. Since other components replace a target parameter having a longer data length included in the original HTTP request by an intermediate parameter having a longer data length so that a data length of the converted HTTP request that is obtained is reduced as compared to a data length of the original HTTP request, an amount of data received by the target component is reduced, thus reducing the amount of data transmitted in the SOA system, and thereby decreasing the network overhead of the SOA system.

In addition, since the amount of data transmitted in the SOA system is reduced by using the technical solutions provided by the present disclosure, the network congestion in the SOA system can be effectively avoided, and the processing efficiency and service performance of the SOA system is improved.

Furthermore, since the amount of data transmitted in the SOA system is reduced by using the technical solutions provided by the present disclosure, not all components on a corresponding invocation path need to transmit all target parameters included in an original HTTP request, thereby effectively reducing the hardware requirements for these components.

Moreover, since the technical solutions provided by the present disclosure can be implemented independent of service implementation logics of target component(s), no impact has been made on the service implementation logics of the target component(s).

Figure 7:
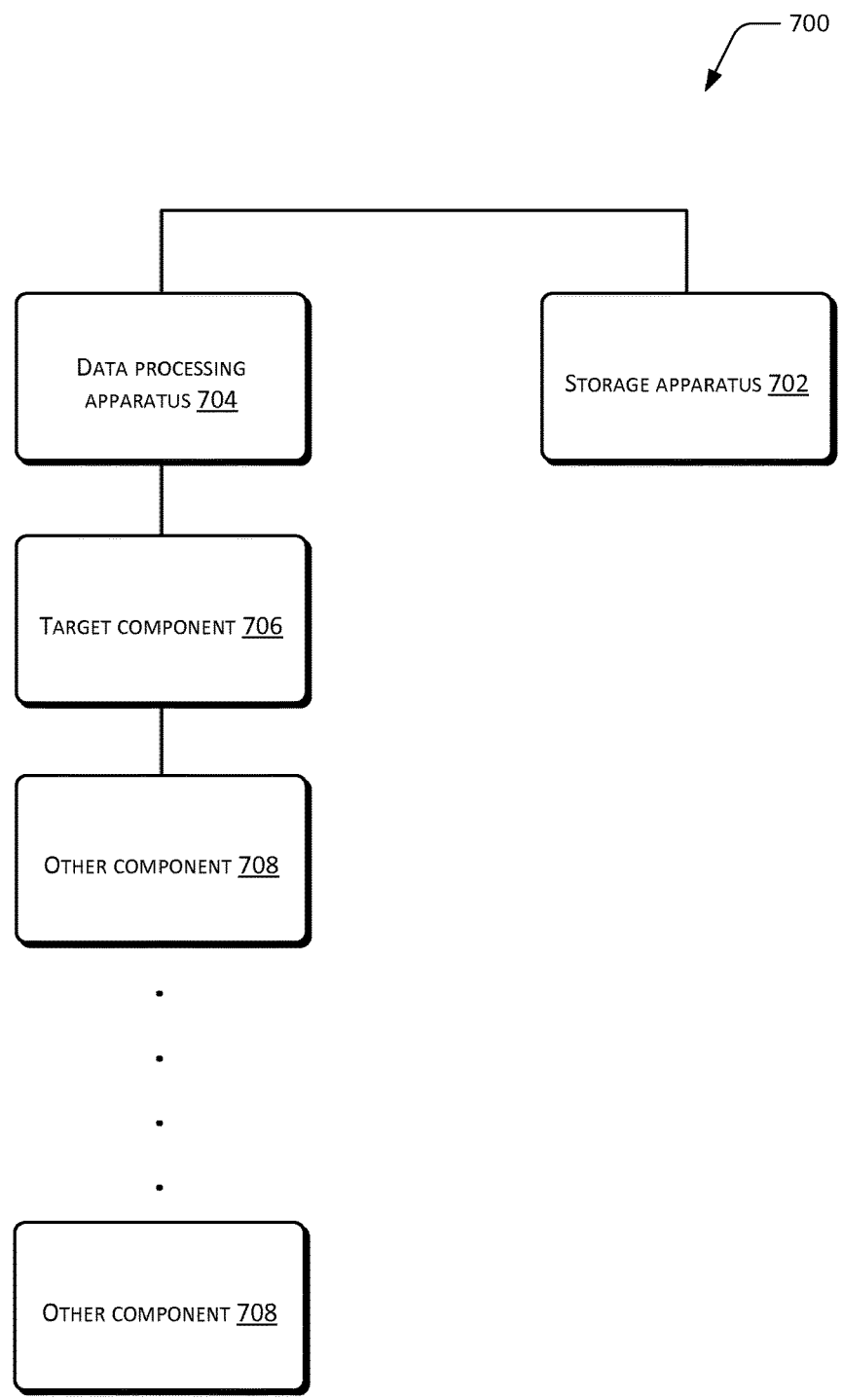
FIG. 7 is a structural diagram illustrating a first SOA system according to the embodiments of the present disclosure.

FIG. 7 is a structural diagram of an SOA system 700 according to another embodiment of the present disclosure. As shown in FIG. 7, the example SOA system 700 may include a storage apparatus 702 and a data processing apparatus 704 of a SOA system that is provided in any embodiment corresponding to FIG. 3, FIG. 4 and FIG. 5. The storage apparatus 702 is configured to store a correspondence relationship between N target parameters and intermediate parameters corresponding to the N target parameters.

It should be noted that the storage apparatus 702, which is included in the SOA system 700, may be newly-added component(s), i.e., deployed independent of a target component 706, or may be functional unit(s) such as a plug-in or a Software Development Kit (SDK) in the target component 706, i.e., integrally deployed with the target component 706, which the embodiment have no limitation thereon.

It should be understood that the number of other components 708 that form an invocation path with the target component 706 may be determined according to a situation in reality, which is not particularly limited by the embodiments.

It should be known that the relevant description of the data processing apparatus 704 in the SOA system 700 may be referenced to content in the embodiments corresponding to FIG. 3, FIG. 4, and FIG. 5, which is not repeatedly described herein.

Figure 8:
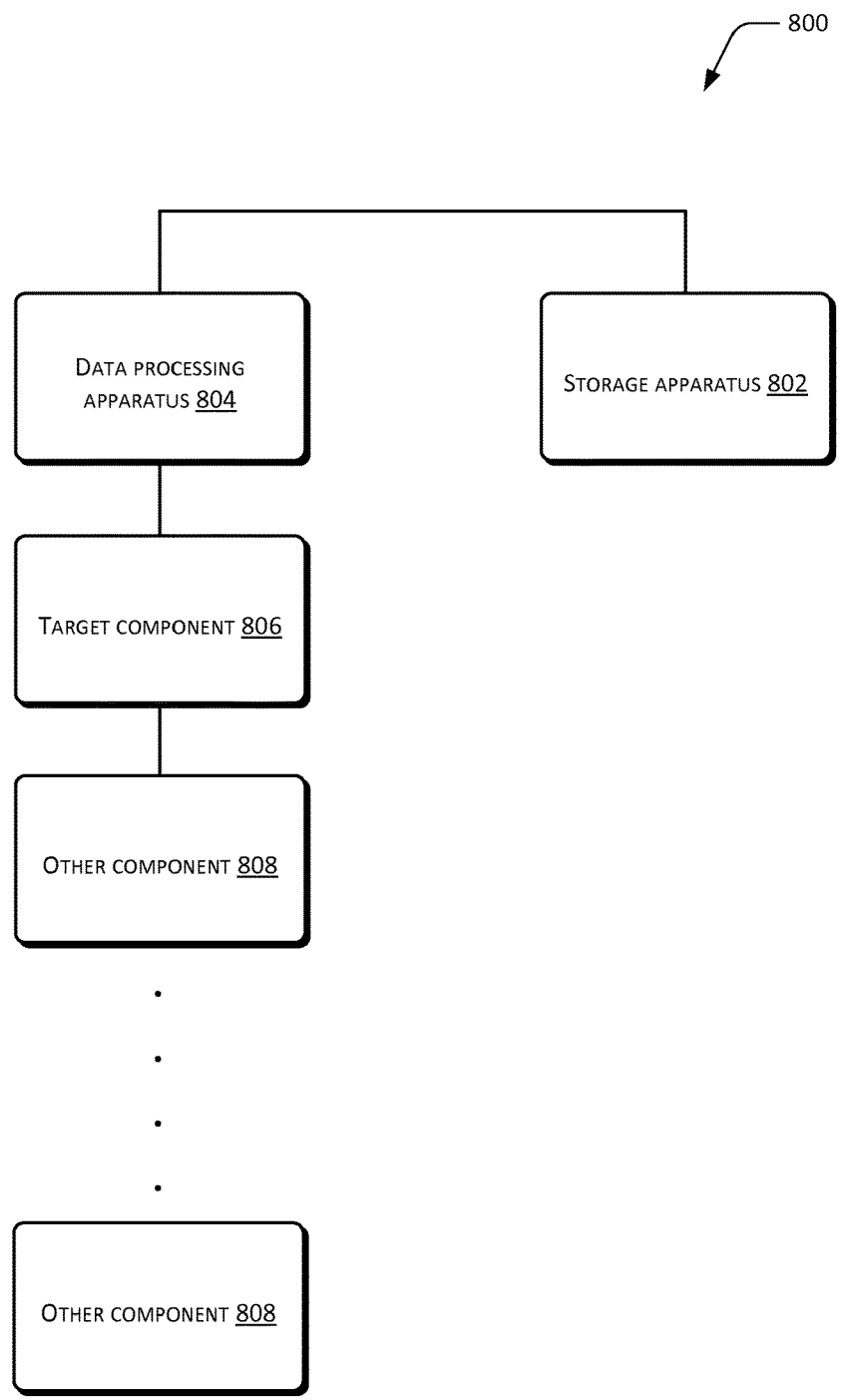
FIG. 8 is a structural diagram illustrating a second SOA system according to the embodiments of the present disclosure.

FIG. 8 shows a structural diagram of an SOA system 800 according to another embodiment of the present disclosure. As shown in FIG. 8, the example SOA system may include a storage apparatus 802 and a data processing apparatus 804 in a SOA system provided in the embodiments corresponding to FIG. 6. The storage apparatus 802 is configured to store a correspondence relationship between N target parameters and intermediate parameters corresponding to the N target parameters.

It should be noted that the storage apparatus 802, which is included in the SOA system 800, may be newly-added component(s), i.e., deployed independent of a target component 806, or may be functional unit(s) such as a plug-in or a Software Development Kit (SDK) in the target component 806, i.e., integrally deployed with the target component 806, which the embodiment have no limitation thereon.

It should be understood that the number of other components 808 that form an invocation path with the target component 806 may be determined according to a situation in reality, which is not particularly limited by the embodiments.

It should be known that the relevant description of the data processing apparatus 804 in the SOA system 800 may be referenced to content in the embodiments corresponding to FIG. 6, which is not repeatedly described herein.

One skilled in the art may clearly understand that exemplary work processes of the systems, the apparatuses and the units described above may be referenced to corresponding processes in the foregoing method embodiments for the sake of convenience and conciseness, and are not repeatedly described herein.

In the embodiments provided by the present disclosure, it should be understood that the disclosed systems, apparatuses and methods may be implemented in other ways. For example, the apparatus embodiments described above are merely exemplary. For example, a division of the units is only a logical division of functions. In reality, other ways of division may exist. For example, multiple units or components may be combined or integrated into another system, or some features may be ignored or may not be implemented. At another point, a mutual coupling, a direct coupling or a communication connection that is displayed or discussed may be an indirect coupling or communication connection via some interfaces, apparatuses or units, which may be electrical, mechanical or other forms.

The units that are described as separate components may or may not be physically separate. Components displayed as units may or may not be physical units, and may be located in a single location, or may be distributed among a plurality of network units. Some or all of the units may be selected according to actual needs to achieve the objectives of the solutions of the embodiments.

In addition, functional units in the embodiments of the present disclosure may be integrated as a single processing unit. Alternatively, each of the units may exist as physically independent. Alternatively, two or more units may be integrated as a single unit. The integrated unit may be implemented in a form of hardware, or may be implemented in a form of a combination of hardware and a software functional unit.

When the integrated unit is implemented in the form of a software functional unit, the integrated unit may be stored in a computer-readable storage media. The software functional unit is stored in a storage media, and includes instructions to cause a computing device (which may be a personal computer, a server, or a network device, etc.) or a processor to perform some of the methods described in the embodiments of the present disclosure. The storage media may include various types of media that are able to store program codes, such as a USB flash drive, a removable hard disk, a read-only memory (ROM), a random access memory (RAM), a magnetic disk, or an optical disk, etc.

Finally, it should be noted that the foregoing embodiments are merely used for describing the technical solutions of the present disclosure, and do not impose any limitation thereon. Although a detailed description of the present disclosure is given with reference to the foregoing embodiments, one of ordinary skill in the art should understand that modifications may still be made to the technical solutions described in the foregoing embodiments, or equivalent replacements may be performed for some of the technical features thereof. These modifications and replacements do not cause the nature of the corresponding technical solutions to depart from the spirit and scope of the technical solutions of the embodiments of the present disclosure.

What is claimed is:

1. A method implemented by one or more computing devices, the method comprising:
    obtaining an original Hypertext Transfer Protocol (HTTP) request that is to be sent by a target component, the original HTTP request including M target parameters, and M being an integer greater than or equal to one;
    ranking the M target parameters in a descending order of a data length of each M target parameter in response to a data length of the original HTTP request being greater than or equal to a preset data threshold, wherein a data length of each of the M target parameters is greater than or equal to a length threshold, a data length of N target parameters is greater than a data length of intermediate parameters corresponding thereto, and N is an integer greater than or equal to one and less than or equal to M;
    selecting first N highest ranking results as the N target parameters from the M target parameters;
    identifying the intermediate parameters based on contents of the M target parameters;
    assigning the intermediate parameters for the N target parameters; and
    performing a parameter replacement processing for the N target parameters using the intermediate parameters corresponding to the N target parameters to obtain a converted HTTP request from the original HTTP request.

2. The method of claim 1, further comprising storing a correspondence relationship between the N target parameters and the intermediate parameters corresponding to the N target parameters.

3. The method of claim 2, wherein storing the correspondence relationship comprises storing the N target parameters and the intermediate parameters corresponding to the N target parameters correspondingly in a database or a file system.

4. The method of claim 1, further comprising determining that the original HTTP request is a POST request of HTTP prior to assigning the intermediate parameters for the N target parameters.

5. The method of claim 1, further comprising sending the converted HTTP request.

6. One or more computer-readable media storing executable instructions that, when executed by one or more processors, cause the one or more processors to perform acts comprising:
    obtaining a first Hypertext Transfer Protocol (HTTP) request that is to be processed by a target component, the first HTTP request including a plurality of processing parameters;
    ranking the plurality of processing parameters in a descending order of a data length of each processing parameter, wherein the data length of each of the plurality of processing parameters is greater than or equal to a length threshold;
    identifying one or more intermediate parameters based on contents in each of the plurality of processing parameters, a number of the one or more intermediate parameters being less than or equal to a number of the plurality of processing parameters;
    obtaining a respective target parameter of one or more target parameters corresponding to each intermediate parameter of the one or more intermediate parameters in the descending ranking order of a corresponding processing parameter, a data length of each intermediate parameter being less than a data length of the respective target parameter of the one or more target parameters; and
    performing a parameter replacement processing on the one or more target parameters using the respective one or more intermediate parameters corresponding to each target parameter to obtain a second HTTP request for the target component to perform a service processing on the second HTTP request.

7. The one or more computer-readable media of claim 6, wherein obtaining the respective target parameter of the one or more target parameters comprises obtaining the respective target parameter of the one or more target parameters corresponding to each intermediate parameter based on a correspondence relationship between the one or more target parameters and the one or more intermediate parameters.

8. The one or more computer-readable media of claim 6, wherein identifying the one or more intermediate parameters is further based on identification information of the one or more target parameters to be processed by the target component.

9. The one or more computer-readable media of claim 6, wherein the first HTTP request comprises a POST request of HTTP.

10. The one or more computer-readable media of claim 6, wherein the first HTTP request is generated from the second HTTP request by converting the respective target parameter of the one or more target parameters corresponding to each intermediate parameter of the one or more intermediate parameters into the respective intermediate parameter.

11. An apparatus comprising:
    one or more processors;
    memory;
    an acquisition unit stored in the memory and executable by the one or more processors to obtain a first Hypertext Transfer Protocol (HTTP) request that is to be sent by a target component, the first HTTP request including M target parameters, M being an integer greater than or equal to one;
    an identification unit stored in the memory and executable by the one or more processors to identify intermediate parameters based on contents of the M target parameters;
    an assignment unit stored in the memory and executable by the one or more processors to, in response to a data length of the first HTTP request being greater than or equal to a preset data threshold, wherein a data length of each of the M target parameters is greater than or equal to a length threshold, a data length of each target parameter of the N target parameters is greater than a data length of the corresponding intermediate parameter of the intermediate parameters, and N is an integer greater than or equal to one and less than or equal to M:
        rank the M target parameters in a descending order of a data length of each M target parameter;
        select first N highest ranking results as the N target parameters from the M target parameters;
        assign the intermediate parameters for the N target parameters; and
    a replacement unit stored in the memory and executable by the one or more processors to perform a parameter replacement processing on at least one target parameter using the one or more intermediate parameters corresponding to the at least one target parameter to obtain a second HTTP request.

12. The apparatus of claim 11, further comprising a storage unit to store a correspondence relationship between the N target parameters and the intermediate parameters corresponding to the N target parameters.

13. The apparatus of claim 12, wherein the storage unit stores the N target parameters and the intermediate parameters corresponding to the N target parameters in a database or a file system correspondingly.

14. The apparatus of claim 11, further comprising a determination unit to determine that the first HTTP request comprises a POST request of HTTP.

15. The apparatus of claim 11, wherein the second HTTP request is sent by the target component after the parameter replacement processing is performed.

* * * * *